Patented June 25, 1940

2,205,947

UNITED STATES PATENT OFFICE 2,205,947

NUCLEAR ALKYL DERIVATIVES OF PHENOL COMPOUNDS

Lawrence H. Flett, Hamburg, N. Y., assignor to National Aniline & Chemical Company, Inc., New York, N. Y., a corporation of New York No Drawing. Application September 25, 1935, Serial No. 42,155

36 Claims. (Cl. 260—512)

This invention relates to the production of chemical compounds. It relates more particularly to the production of compounds which are nuclear alkyl derivatives of phenol and cresols and their sulfonic acids, in which the alkyl group contains at least 12 carbon atoms, more particularly 12 to 23 carbon atoms and especially 14 to 19 carbon atoms.

According to the present invention a primary, saturated alcohol containing at least 12 carbon atoms (preferably 12 to 23, and especially 14 to 19, carbon atoms) is condensed with phenol or a cresol, preferably with the aid of a metal halide condensing agent, to produce the corresponding nuclear alkyl phenol, and the resulting alkyl phenol is sulfonated.

It has been found when a straight chain, primary, saturated alcohol containing at least 12 carbon atoms is condensed with phenol or a cresol to produce the corresponding nuclear alkyl phenol, the principal constituent of the resulting product does not contain a long chain alkyl radical linked to the phenol nucleus through the alpha (ultimate) carbon atom of the alcohol but contains a long chain alkyl radical linked to the phenol nucleus through the beta (penultimate) carbon atom of the alcohol, with the result that the product is principally a secondary-alkyl phenol or cresol in which a secondary hydrocarbon radical containing at least 12 carbon atoms is directly linked to the phenol nucleus by the secondary carbon atom, and corresponding with the general formula

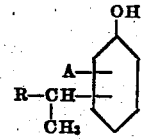

in which A is hydrogen or a methyl group and R is a saturated alkyl hydrocarbon radical containing at least 10 carbon atoms. For convenience, such compounds are referred to as "mono-alkyl" phenol compounds, although they may also contain a methyl group when the phenol employed is a cresol. The sulfonated products in the free acid or salt form correspond with the general formula

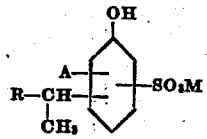

in which A is hydrogen or a methyl group, R is a saturated alkyl hydrocarbon radical containing at least 10 carbon atoms, and M represents hydrogen, a metal, the ammonium radical or an organic ammonium radical. It has further been found, according to the present invention, when the resulting alkyl phenol (and cresol) sulfonic acids are employed in the arts, particularly in the form of their soluble salts, and especially their alkali metal salts, very advantageous detergent, wetting and foaming action is obtained. They show unusual cleaning action under a wide variety of conditions. Without limiting the invention to any theoretical considerations, it appears the branched carbon chain alkyl radical which results from the process contributes to the valuable properties of the products.

The invention is of particular advantage in that it permits the production of the said branched chain nuclear alkyl derivatives of phenol and cresol and the sulfonic acids from readily available, straight-chain, saturated, primary higher fatty alcohols (as for example, lauryl alcohol, myristyl alcohol, cetyl alcohol, stearyl alcohol, and the like) as well as mixtures thereof with each other or with other alcohols, which in turn can be obtained from naturally occurring animal or vegetable oils, fats, waxes, etc. and/or their corresponding fatty acids.

The invention will be illustrated by the following specific examples in which the parts are by weight and temperatures are in degrees centigrade. It will be understood by those skilled in the art that the scope of the invention is not limited to these specific examples.

*Example 1.*—Equal parts of solid cetyl alcohol and anhydrous phenol are melted and mixed together. An amount of powdered anhydrous zinc chloride equal in weight to the cetyl alcohol is then added and the whole mass is refluxed for 16 to 20 hours with sufficient agitation to keep the zinc chloride in suspension, the temperature during the refluxing varying between 175° and 185°. The parts by weight of the ingredients employed are equivalent to one mol of cetyl alcohol, 2.6 mols of anhydrous phenol and 1.8 mols of anhydrous zinc chloride. The condensation reaction mass is cooled and allowed to stand sufficiently to set and settle the zinc chloride, the oily layer (crude cetyl phenol) is decanted and washed with one-third of its weight of hot water (80° to 90°) to decompose any zinc chloride complex or double salts. Any emulsion formed during the washing is broken by the addition of small quantities of sodium chloride. The washed oil is separated from water by stratification and is then distilled under a vacuum to purify it. The fraction boiling between 190° and 225° at 4 mm. pressure is separately collected and represents the purified cetyl phenol. It is a viscous oil, practically insoluble in water but soluble in many organic solvents. As distinguished from the isomeric normal straight chain primary cetyl phenol, which is obtained by fusion of the corresponding cetyl benzene sulfonate with caustic alkali and which is a solid melting at 77.5° C. and boiling at about 260° C. at 16 mm. pressure, the cetyl phenol of this example is a lower boiling viscous oil. The principal constituent is para-cetyl-phenol having the probable formula:

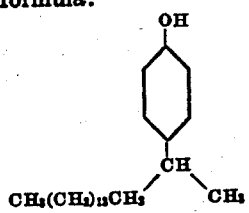

To 30 parts of the purified cetyl phenol, 36 parts of 100% sulfuric acid are added with sufficient agitation to insure thorough mixing without aerating the mass; the temperature of the mass being maintained below 50°, and the sulfuric acid being added gradually so as to avoid exceeding this temperature. The mass is further agitated while preventing the temperature from exceeding 50° until the desired sulfonation has been attained (for example, for an additional period of a half hour or more). For production of a product which does not cause precipitation of lime salts and which forms a clear solution in dilute acid solutions, the sulfonation is carried to an extent such that a 0.5 gram sample of the sulfonation reaction mixture dissolved in 30 cc. of distilled water with the aid of stirring and gentle heating, followed by neutralization with sodium hydroxide solution until the solution reacts faintly acid to Congo red test paper, remains clear upon addition of 220 cc. of distilled water and furthermore, when 1 cc. of a 10% CaCl₂ solution is added to the resulting diluted solution, the precipitate which forms disappears upon stirring, leaving a clear solution. Upon completion of the sulfonation the sulfonation reaction mixture is poured with stirring into 275 parts of water containing 23 parts of sodium hydroxide, the addition being sufficiently gradual to avoid rise in the temperature of the resulting solution above 60°. There is thus obtained sodium cetyl phenol sulfonate in an aqueous solution containing sodium sulfate in a considerable amount. The hydrogen ion concentration of the resulting solution may be adjusted to the desired value by suitable acidification or treatment with alkali. The resulting solution is dried on an atmospheric rotary drum drier heated with steam at 40 to 50 pounds pressure, the product being scraped from the rolls in a granular to flake-like or powdered form. In order to avoid corrosion of the drying rolls, the product is preferably dried in a slightly alkaline condition. The product may also be dried in shallow pans or trays in a vacuum drier at temperatures not exceeding 100°.

*Example 2.*—100 parts of commercial cetyl alcohol (containing 30 to 40% of normal cetyl alcohol, 30 to 40% of higher alcohols than cetyl, such as stearyl alcohol, etc., about 10 per cent of normal lauryl alcohol and about 20 percent of normal myristyl alcohol), 100 parts of phenol, and 100 parts anhydrous zinc chloride are heated at 160° to 180° under a reflux condenser, with agitation for 16 hours or until condensation is practically complete.

The condensation product is washed with water until practically free from water soluble products. The resulting oil is fractionally distilled in vacuo. The fraction of the distillate which is collected between 195° and 240° at 15 mm. pressure of mercury is a faint yellow to water-white oil consisting chiefly of a mixture of alkyl phenols having the probable formula:

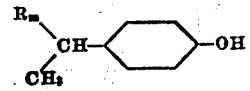

in which $R_m$ is a straight chain hydrocarbon radical having the formula:

$$C_{10}H_{21}, C_{12}H_{25}, C_{14}H_{29} \text{ or } C_{16}H_{33}$$

the compound in which $R_m$ is $C_{14}H_{29}$ predominating, with a small amount of normal alkyl phenols and probably some ortho isomers present. It is practically insoluble in water and soluble in many organic solvents.

100 parts of the purified hexadecyl (cetyl) phenol thus obtained, 40 parts of acetic anhydride, and 160 parts of sulfuric acid monohydrate are mixed together and warmed gently to 70°–75° until the product is completely soluble in water and a 0.2 per cent solution of which, after neutralization, does not precipitate calcium salts from a solution of calcium chloride or other soluble calcium salt containing the equivalent of 0.224 gram calcium oxide per liter. The mass is diluted with water to a final volume of 450 to 600 parts and neutralized with alkali, as for example, caustic soda or caustic potash or their equivalents. The neutral solution is clarified, if desired, by filtration, and evaporated to dryness. The product is a brown to white solid soluble in water to give brown to water-white solutions. It comprises a mixture of inorganic salts (e. g., sodium sulfate) with sulfonates of the said alkyl phenols (e. g., in the form of the sodium salts), of which mixture the inorganic salts constitute in the neighborhood of 60 per cent. The alkyl phenol sulfonates contained therein are soluble in alcohol, benzene and other organic solvents.

In this example, if crude or undistilled hexadecyl phenol is used, a product having inferior detergent properties but having valuable insecticidal and emulsifying properties is obtained.

*Example 3.*—The neutralized solution of hexadecyl phenol sulfonic acid prepared in Example 2 or the equivalent aqueous solution prepared from the final dry sulfonates, is diluted with an equal volume of commercial denatured alcohol, thoroughly mixed for several hours, filtered and evaporated to dryness; or the dry sulfonates are extracted with successive portions of denatured alcohol, the total amount of alcohol used for this extraction being preferably approximately four times the weight of the dry unextracted sulfonate, the combined extracts are mixed and digested with a small amount of animal charcoal, filtered and evaporated to dryness. The residue obtained in either case is a sodium hexadecyl phenol sulfonate practically free from salts of mineral acids. By adding a small amount of alkali before evaporation, a white, friable solid having a soap-like appearance and which is readily soluble in water is obtained.

*Example 4.*—100 parts of octadecyl alcohol (stearyl alcohol), 100 parts of phenol, and 100 parts of anhydrous zinc chloride are mixed and refluxed for about 16 hours. The condensation product is washed with water till practically free of water-soluble products and the resulting oil is fractionally distilled in vacuo. The fraction of the distillate collected between 235° to 270° at 14 mm. mercury pressure comprises chiefly para-octadecyl phenol having the probable formula

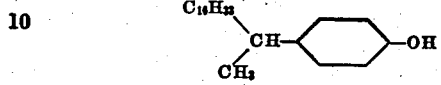

mixed with a small amount of normal octadecyl phenol and probably a small amount of the corresponding ortho isomers. It is a viscous oil practically insoluble in water and soluble in many organic solvents, and having a lower boiling point than the isomeric normal straight chain primary octadecyl phenol obtained by fusion of the corresponding octadecyl benzene sulfonate with caustic alkali.

100 parts of the resulting octadecyl phenol, 20 parts of acetic anhydride and 70 parts of 26% oleum are mixed slowly at 40° and gently warmed to a temperature of 80° until a sample is completely soluble in water and a 0.2 per cent solution of which, after neutralization, does not precipitate calcium salts from a solution of calcium chloride (or other soluble calcium salt solution) containing the equivalent of 0.224 gram calcium oxide per liter. The mass is diluted, neutralized and finished as described in Example 2.

Instead of the alkyl phenols and mixtures employed in the above examples for the production of sulfonated alkyl phenol products, other alkyl phenols and cresols and mixtures thereof may be similarly prepared and sulfonated. The following additional examples illustrate the preparation of such alkyl phenol products.

*Example 5.*—100 parts of commercial cetyl alcohol, 100 parts p-cresol and 100 parts anhydrous zinc chloride are refluxed as in Example 2 for 5 to 16 hours and the product is recovered by washing the resulting oil with dilute hydrochloric acid and fractionally distilling the washed oil in vacuo. The fraction of the distillate which is collected between 202° to 218° at 3 mm. pressure consists chiefly of a mixture of alkyl cresols in which the predominating compound is a secondary cetyl p-cresol having the probable formula

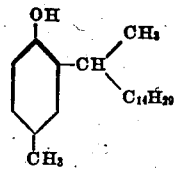

It is a viscous oil practically insoluble in water and soluble in many organic solvents.

*Example 6.*—Meta-cresol is employed instead of p-cresol in the process of Example 5 and the reaction mixture is refluxed for 6 hours. The product is recovered after washing with dilute hydrochloric acid by fractionally distilling in vacuo. The fraction of the distillate which is collected at 208° to 228° at 5 mm. pressure consists chiefly of a mixture of alkyl cresols in which the predominating compounds are secondary cetyl m-cresols having the secondary cetyl group in the ortho- or para-position to the hydroxyl group.

*Example 7.*—100 parts of commercial lauryl alcohol (obtained by hydrogenation of fatty acids from cocoanut oil), 100 parts of phenol, and 100 parts of anhydrous zinc chloride are mixed and refluxed at 190° to 200° C. with agitation for about 16 hours. The condensation product is washed with water until practically free of water-soluble products, and the resulting oil is fractionally distilled in vacuo. The fraction of the distillate collected as a faint yellow to water-white oil between 210° and 230° at 13 mm. mercury pressure consists chiefly of alkyl phenols of which the probable formula of the principal constituent is

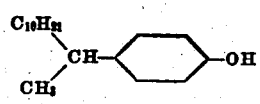

*Example 8.*—100 parts of commercial lauryl alcohol (obtained by hydrogenation of fatty acids derived from cocoanut oil and containing capryl, decyl, lauryl, myristyl, cetyl and stearyl alcohols), 100 parts of ortho-cresol and 100 parts of anhydrous zinc chloride are mixed, and refluxed at 190° to 200° with agitation for about 16 hours. The condensation product is washed with water until practically free of water-soluble products, and the resulting oil is fractionally distilled in vacuo. The fraction of the distillate collected between 215° and 230° at 13 mm. mercury pressure is a faint yellow to water-white oil and consists of a mixture of alcyl substituted ortho-cresols of which the principal components have the probable formulae:

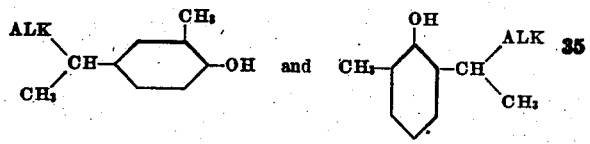

in which ALK is a straight chain alkyl hydrocarbon radical of the formula $C_8H_{13}$, $C_8H_{17}$, $C_{10}H_{21}$, $C_{12}H_{25}$, $C_{14}H_{29}$ or $C_{16}H_{33}$. The average molecular weight corresponds with a product in which the chain represented by ALK has approximately the formula $C_{10}H_{21}$.

*Example 9.*—Cresylic acid (a commercial mixture of cresols) is substituted for the ortho-cresol of Example 8. The fraction of the distillate boiling between 215°–240° at 13 mm. mercury pressure is separately collected. It is a faint yellow to water-white oil comprising a mixture of long chain alkyl derivatives of ortho-, meta-, and para-cresol.

As above indicated, changes may be made in the process hereinbefore described without departing from the scope of the invention.

Thus, phenol, ortho-, meta-, or para-cresol or their mixtures may be employed. The alcohol employed for condensation with the phenol or cresol is a straight chain, primary alcohol containing at least 12 carbon atoms, preferably 12 to 23 carbon atoms, and especially 14 to 19 carbon atoms.

As condensing agents there may be employed anhydrous zinc chloride, anhydrous aluminum chloride, anhydrous antimonic chloride, anhydrous ferric chloride, etc. Zinc chloride is preferred as the condensing agent. While the zinc chloride and other metal halide condensing agents mentioned have been referred to as "anhydrous," it is noted that said condensing agents may be employed in a partially hydrated condition containing small amounts of water, for instance such as are absorbed from the surrounding atmosphere or otherwise in commercial operation, but insufficient to interfere with their action as condensing agents.

Preferably the proportion of alcohol employed with respect to the phenol is such that not more than one alkyl radical of the type represented by R in the foregoing formula is contained in the resulting alkyl phenol. Thus, at least 1.25 mols of phenol per mol of alcohol is preferably employed in the condensation. A ratio as low as 1 to 1 or lower may be employed, but the yield of the resulting alkyl phenol containing one long alkyl group will be less. The amount of condensing agent employed also may vary. In general a long chain alcohol (as for example, lauryl or cetyl alcohol) requires at least about an equal weight of zinc chloride for best results.

The time during which the condensation reaction of the alcohol and phenol may be carried out also may be varied. For example, a satisfactory yield of alkyl phenol in general can be obtained by heating the alcohol, the phenol and anhydrous zinc chloride at refluxing temperature conditions for about 7 hours and at lower temperatures for correspondingly longer periods of time. The quality of the recovered alkyl phenols and the detergency of the alkyl phenol sulfonates produced therefrom appear to be improved however by carrying out the heating for a longer period of time. With zinc chloride as the condensing agent, the period of heating at refluxing temperatures may be extended to 16 hours or more without seriously harming the quality or substantially decreasing the yield of the alkyl phenol, and at a temperature of about 135° C. the period of heating may similarly be 30 hours or more.

The crude alkyl phenol resulting from the condensation is preferably purified, as for example, by fractional distillation and collecting a middle fraction having in general a boiling point range of not more than 100° C., and the purified compound is preferably employed for sulfonation. Distillation is preferably carried out at a pressure not exceeding 30 mm. to avoid decomposition.

In sulfonating the alkyl phenol or cresol, an inert solvent and/or a sulfonation assistant may or may not be used. As sulfonating agents there may be employed sulfuric acids of various strengths (e. g., 66° Bé. sulfuric acid, sulfuric acid monohydrate, oleum) chlorosulfonic acid, etc. As solvents or diluent there may be employed any inert organic liquid which is not readily sulfonated; such as halogenated hydrocarbons of the aliphatic and aromatic series, as for example, carbon tetrachloride, dichlorethane, tetrachlorethane, dichlorbenzene, etc. When an inert solvent or diluent is used, it may be separated from the alkaline aqueous solution of the sulfonic acid salt of the alkyl phenol which results upon diluting the sulfonation mass with water and neutralizing or it may be separated in the process of drying said salt. As sulfonation assistants there may be employed the lower organic acids and/or their anhydrides, as for example, acetic acid, acetic anhydride, etc.

The sulfonation may be carried out with the aid of heating or cooling, as required, depending upon the ease of sulfonation of the alkyl phenol or cresol and the sulfonating power of the sulfonating agent. For example, temperatures as low as about 0° and as high as about 140° C. may be employed. In general, the more vigorous the sulfonating agent the lower is the preferred temperature. Ordinarily the completion of the sulfonation is carried out at a temperature in the neighborhood of about 25° to about 80° C. The ratio of sulfonating agent employed with respect to the alkyl phenol also may be varied. While the preferred amounts are given in the above examples, an amount of sulfuric acid or other sulfonating agent equivalent to from 1 to about 5 parts by weight of sulfuric acid monohydrate per part by weight of the alkyl phenol may be employed.

The extent to which the sulfonation is carried out may vary with the individual material being sulfonated and the use to be made of the sulfonated product. In general, the extent of sulfonation of the alkyl phenol treated is such as to form chiefly the monosulfonic acid of the alkyl phenol, and to sulfonate impurities as well, if present. In some cases, a degree of sulfonation which corresponds with a product having maximum detergent properties is not completely soluble in water to form a clear solution and/or may cause some precipitation of lime salts. (An aqueous solution of calcium chloride containing the equivalent of 0.224 gram of calcium oxide per liter of solution is merely employed in the above examples as a representative hard water solution for test purposes. It is to be noted that the invention is in no respect limited thereto.)

The alkyl phenol sulfonates may be produced in accordance with the present invention in the form of their free sulfonic acids or in the form of salts of metals (as for example, of the alkali metals) or of organic bases, or of ammonia, etc. The salts may be obtained in any suitable manner; for example by reacting the sulfonated product, either in the crude form resulting from the sulfonation or in a purified form, with a metal oxide or hydroxide, ammonia or an organic base, or of a suitable salt of one of these, in an amount adapted to form a neutral product. Among the bases, oxides and salts which may be combined with the sulfonated products to produce salts in accordance with the present invention are, for example, sodium, potassium and ammonium hydroxides; sodium, potassium and ammonium carbonates and bicarbonates; ammonia; magnesium oxide; ethylamine; pyridine; triethanolamine; propanolamines; butanolamines; diamino propanol; ethylenediamine; triethylene tetramine; etc.

The reaction mixtures resulting from the sulfonation of the alkyl phenol or cresol may also be directly employed for the formation of mixed products, as for example mixtures of salts of the alkyl phenol sulfonic acid and of other acids present in said reaction mixtures, which mixtures of salts are also useful as such. Thus, the sulfonation reaction mixture resulting from the treatment of the alkyl phenol or cresol with an amount of sulfonating agent in excess of that theoretically required to effect the desired degree of sulfonation may be treated with a suitable inorganic or organic base or basic salt (as for example, one of those mentioned) and the resulting mixture of the salt of the sulfonated alkyl phenol or cresol and the salt of the other acid (as for example, sodium sulfate) may be jointly isolated from the reaction mixture and employed as such. If it is desired to produce a salt of the sulfonated alkyl phenol or cresol in a form substantially free from inorganic salts (for example, inorganic sulfates) this may be accomplished by taking advantage of the solubility of the salts of the sulfonated products in alcohol and other organic solvents. Thus a mixture of a salt of the sulfonated product and an inorganic sulfate may be extracted with alcohol, and the resulting extract may be evaporated to leave a residue of the purified salt of the sulfonated product, as described in Example 3.

The sulfonated products in the form of metallic salts or salts of inorganic bases are usually yellowish to white, friable solids; and in the form of salts of organic bases vary from viscous oils to semi-solids to solids. In general, the salts are readily soluble in water and in aqueous (neutral, acid or alkaline) solutions to form solutions which are faintly colored brown or yellow, which are of a soapy nature and which foam readily. Certain of the salts, such as the salts of the aromatic monoamines and the aliphatic and aromatic polyamines, are oils which generally are insoluble in water because of the presence of organic impurities but soluble in organic solvents (as for example, benzene, gasoline, etc.) and in aqueous solutions of alkalis (presumably by conversion to the salts of the alkalis).

This application is a continuation-in-part of applications Serial Nos. 691,081 and 691,082, filed September 26, 1933.

I claim:

1. A method of producing a nuclear alkyl derivative of a sulfonated phenol, which comprises forming a phenol compound containing a higher alkyl substituent by condensing a phenol compound of the group consisting of phenol and its monomethyl derivatives with a saturated, primary alcohol containing at least 12 carbon atoms with the aid of a condensing agent, the amount of alcohol not exceeding about that required to produce monoalkylation of the phenol compound, and sulfonating the alkylated phenol compound.

2. A method of producing a nuclear alkyl derivative of a sulfonated phenol, which comprises forming a phenol compound containing a higher alkyl substituent by condensing a phenol compound of the group consisting of phenol and its monomethyl derivatives with a saturated, primary alcohol containing at least 12 carbon atoms with the aid of a metal halide condensing agent, the amount of alcohol not exceeding about that required to produce monoalkylation of the phenol compound, and sulfonating the alklated phenol compound.

3. A method of producing a nuclear alkyl derivative of a sulfonated phenol, which comprises forming a phenol compound containing a higher alkyl substituent by condensing a phenol compound of the group consisting of phenol and its monomethyl derivatives with a saturated, primary alcohol containing 12 to 23 carbon atoms with the aid of a metal halide condensing agent, the amount of alcohol not exceeding about that required to produce monoalkylation of the phenol compound, and sulfonating the alkylated phenol compound.

4. A method of producing a nuclear alkyl derivative of a sulfonated phenol, which comprises forming a phenol compound containing a higher alkyl substituent by condensing a phenol compound of the group consisting of phenol and its monomethyl derivatives with a saturated, primary alcohol containing 14 to 19 carbon atoms with the aid of a metal halide condensing agent, the amount of alcohol not exceeding about that required to produce monoalkylation of the phenol compound, and sulfonating the alkylated phenol compound.

5. A method of producing nuclear alkyl derivatives of sulfonated phenols, which comprises forming a phenol compound containing a higher alkyl substituent by condensing a phenol compound of the group consisting of phenol and its monomethyl derivatives with a mixture of alcohols containing at least 2 saturated primary alcohols, each having at least 12 carbon atoms, with the aid of a metal halide condensing agent, said alcohols corresponding with the fatty acid radicals of naturally occuring oils, fats and waxes, the amount of alcohol mixture not exceeding about that required to produce monoalkylation of the phenol compound, and sulfonating the resulting mixture of alkylated phenol compounds.

6. A method of producing a nuclear alkyl derivative of a sulfonated phenol, which comprises reacting one mol of a phenol compound of the group consisting of phenol and its monomethyl derivatives with less than one mol of a saturated, primary alcohol containing at least 12 carbon atoms and anhydrous zinc chloride, whereby the corresponding alkyl phenol compound is produced, and sulfonating said alkyl phenol compound.

7. A method of producing a nuclear alkyl derivative of a sulfonated phenol, which comprises heating about one mol of a straight chain, saturated, primary alcohol containing 14 to 19 carbon atoms with at least 1.25 mols of phenol and anhydrous zinc chloride to produce the corresponding alkyl phenol, and sulfonating the alkyl phenol.

8. A method of producing a nuclear alkyl derivative of a sulfonated phenol, which comprises heating about one mol of commercial cetyl alcohol with at least 1.25 mols of phenol and anhydrous zinc chloride to produce a mixture of monoalkyl phenols comprising secondary-cetyl phenol, and sulfonating the mixture of alkyl phenols.

9. A method of producing a nuclear alkyl derivative of a phenol, which comprises condensing a phenol compound of the group consisting of phenol and its monomethyl derivaives with a saturated, primary alcohol containing at least 12 carbon atoms with the aid of a condensing agent, the amount of alcohol not exceeding about that required to produce monoalkylation of the phenol compound.

10. A method of producing a nuclear alkyl derivative of a phenol, which comprises condensing a phenol compound of the group consisting of phenol and its monomethyl derivatives with a saturated, primary alcohol containing at least 12 carbon atoms with the aid of a metal halide condensing agent, the amount of alcohol not exceeding about that required to produce monoalkylation of the phenol compound.

11. A method of producing nuclear alkyl derivatives of phenols, which comprises forming a phenol compound containing a higher alkyl substituent by condensing a phenol compound of the group consisting of phenol and its monomethyl derivatives with a mixture of alcohols containing at least 2 saturated primary alcohols, each having at least 12 carbon atoms, with the aid of a metal halide condensing agent, said alcohols corresponding with the fatty acid radicals of naturally occurring oils, fats and waxes, the amount of alcohol mixture not exceeding about that required to produce monoalkylation of the phenol compound.

12. A method of producing a nuclear alkyl derivative of a phenol, which comprises reacting one mol of a phenol compound of the group consisting of phenol and its monomethyl derivatives with less than one mol of a saturated, primary alcohol containing a least 12 carbon atoms and anhydrous zinc chloride.

13. A method of producing a nuclear alkyl derivative of a phenol, which comprises heating about one mol of a straight chain, saturated, primary alcohol containing 14 to 19 carbon atoms with at least 1.25 mols of phenol and anhydrous zinc chloride.

14. A nuclear alkyl derivative of a phenol selected from the group consisting of phenol and its monomethyl derivatives containing at least 12 carbon atoms in a single secondary hydrocarbon radical directly linked to the phenol nucleus by the secondary carbon atom.

15. A nuclear alkyl derivative of a phenol selected from the group consisting of phenol and its monomethyl derivatives containing at least 12 carbon atoms in a single secondary hydrocarbon radical directly linked to the phenol nucleus by the secondary carbon atom, said nuclear derivative of phenol corresponding with the general formula

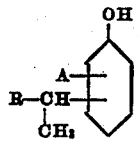

in which A is a member of the group consisting of hydrogen and the methyl radical and R is a saturated alkyl hydrocarbon radical containing at least 10 carbon atoms.

16. A nuclear alkyl derivative of a phenol selected from the group consisting of phenol and its monomethyl derivatives containing 12 to 23 carbon atoms in a single secondary hydrocarbon radical directly linked to the phenol nucleus by the secondary carbon atom, said nuclear alkyl derivative of phenol corresponding with the general formula

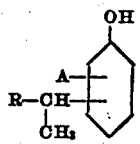

in which A is a member of the group consisting of hydrogen and the methyl radical and R is a saturated alkyl hydrocarbon radical containing 10 to 21 carbon atoms.

17. A method of producing a nuclear alkyl derivative of a sulfonated phenol, which comprises sulfonating a nuclear alkyl derivative of a phenol selected from the group consisting of phenol and its monomethyl derivatives containing at least 12 carbon atoms in a single secondary hydrocarbon radical directly linked to the phenol nucleus by the secondary carbon atom.

18. A method of producing a nuclear alkyl derivative of a sulfonated phenol, which comprises sulfonating a nuclear alkyl derivative of a phenol selected from the group consisting of phenol and its monomethyl derivatives containing 12 to 23 carbon atoms in a single secondary hydrocarbon radical directly linked to the phenol nucleus by the secondary carbon atom.

19. A method of producing a nuclear alkyl derivative of a sulfonated phenol, which comprises sulfonating a nuclear alkyl derivative of a phenol selected from the group consisting of phenol and its monomethyl derivatives containing at least 12 carbon atoms in a single secondary hydrocarbon radical directly linked to the phenol nucleus by the secondary carbon atom, said nuclear derivative of phenol corresponding with the general formula

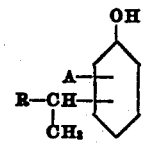

in which A is a member of the group consisting of hydrogen and the methyl radical and R is a saturated alkyl hydrocarbon radical containing at least 10 carbon atoms.

20. A method of producing a nuclear alkyl derivative of a sulfonated phenol, which comprises sulfonating a nuclear alkyl derivative of a phenol selected from the group consisting of phenol and its monomethyl derivatives containing 12 to 23 carbon atoms in a single secondary hydrocarbon radical directly linked to the phenol nucleus by the secondary carbon atom, said nuclear alkyl derivative of phenol corresponding with the general formula

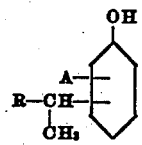

in which A is a member of the group consisting of hydrogen and the methyl radical and R is a saturated alkyl hydrocarbon radical containing 10 to 21 carbon atoms.

21. The long chain alkylated phenols obtained by condensing approximately two mols of a phenol compound selected from the group consisting of phenol and its monomethyl derivatives with one mol of a primary saturated aliphatic alcohol containing a chain of 12 to 18 carbon atoms in the presence of an inorganic dehydrating agent, said products being characterized by the fact that their melting and boiling points are less than those of isomeric normal straight chain primary alkyl phenols which are made by fusion of alkyl benzene sulphonates with caustic alkali.

22. The long chain alkylated phenols obtained by condensing approximately two mols of a phenol compound selected from the group consisting of phenol and its monomethyl derivatives with one mol of a primary saturated aliphatic alcohol containing a chain of from 12 to 18 carbon atoms in the presence of anhydrous zinc chloride, said products being characterized by the fact that their melting and boiling points are less than those of isomeric normal straight chain primary alkyl phenols which are made by fusion of alkyl benzene sulphonates with caustic alkali.

23. The long chain alkylated phenol obtainable by condensing a primary dodecyl alcohol and phenol in the presence of anhydrous zinc chloride at a condensation temperature, said product being characterized by the fact that its melting and boiling points are less than those of the normal dodecyl phenol which is made by reduction of normal dodecylyl phenol.

24. The process of making a dodecyl phenol which comprises heating and agitating a primary dodecyl alcohol, phenol, and anhydrous zinc chloride, washing the liquid product with water, and fractionating the liquid product.

25. The method of producing dodecyl phenol which comprises heating at a condensation temperature, a reaction mixture containing phenol, lauryl alcohol and zinc chloride as a condensing agent.

26. Dodecyl phenol prepared by heating at a condensation temperature a reaction mixture containing phenol, lauryl alcohol and zinc chloride as a condensing agent.

27. The long chain alkyl phenols obtained by condensing a phenol selected from the group consisting of phenol and its monomethyl derivatives with primary, saturated aliphatic alcohols containing chains of at least 12 carbon atoms in the presence of an inorganic dehydrating agent, said products being characterized by the fact that their melting and boiling points are less than those of isomeric normal straight chain primary alkyl phenols which are made by fusion of alkyl benzene sulphonates with caustic alkali.

28. The long chain monoalkyl phenols obtained by condensing a phenol selected from the group consisting of phenol and its monomethyl derivatives with primary, saturated aliphatic alcohols containing chains of at least 12 carbon atoms in the presence of anhydrous zinc chloride, said products being characterized by the fact that their melting and boiling points are less than those of isomeric normal straight chain primary alkyl phenols which are made by fusion of alkyl benzene sulphonates with caustic alkali.

29. The long chain monoalkyl phenols obtained by reacting phenol compounds selected from the group consisting of phenol and its monomethyl derivatives with normal, primary aliphatic alcohols having chains containing at least 12 carbon atoms in the presence of a dehydrating agent, said products being characterized by the fact that their melting and boiling points are less than those of isomeric normal straight chain primary alkyl phenols which are made by fusion of alkyl benzene sulphonates with caustic alkali.

30. The long chain monoalkyl phenols obtained by reacting phenol compounds selected from the group consisting of phenol and its monomethyl derivatives with normal, primary saturated aliphatic alcohols having chains containing at least 12 carbon atoms in the presence of a dehydrating agent, said products being characterized by the fact that their melting and boiling points are less than those of isomeric normal straight chain primary alkyl phenols which are made by fusion of alkyl benzene sulphonates with caustic alkali.

31. The long chain monoalkyl phenols obtained by condensing approximately one mol of a phenol selected from the group consisting of phenol and its monomethyl derivatives with at least one-half mol of primary, saturated aliphatic alcohols containing chains of 12 to 20 carbon atoms in the presence of anhydrous zinc chloride at a condensation temperature not greatly above the reflux temperature, said products being characterized by the fact that their melting and boiling points are less than those of isomeric normal straight chain primary alkyl phenols which are made by fusion of alkyl benzene sulphonates with caustic alkali.

32. The long chain monoalkyl phenols obtained by reacting a phenol selected from the group consisting of phenol and its monomethyl derivatives with lauryl alcohol in the presence of an inorganic compound capable of functioning as a dehydrating agent at the reaction temperature, said products being characterized by the fact that their melting and boiling points are less than those of the isomeric normal dodecyl phenol which is made by reduction of the corresponding normal dodecylyl phenol.

33. The process of preparing long chain alkyl phenols which comprises condensing a phenol selected from the group consisting of phenol and its monomethyl derivatives with a primary dodecyl alcohol in the presence of anhydrous zinc chloride, cooling the reaction mixture, purifying the reaction mixture, and distilling the products.

34. The process of making long chain alkyl phenols which comprises heating a primary dodecyl alcohol with a phenol selected from the group consisting of phenol and its monomethyl derivatives, in the presence of anhydrous zinc chloride at a condensation temperature, cooling the reaction mixture, washing it with water, and distilling the product to obtain a secondary-dodecyl phenol.

35. The long chain alkyl phenols obtained by reacting a phenol selected from the group consisting of phenol and its monomethyl derivatives with the mixture of alcohols obtained by hydrogenating coconut oil, in the presence of an inorganic compound capable of functioning as a dehydrating agent at the reaction temperature.

36. The long chain alkyl phenols obtained by condensing phenol with the mixture of long chain alcohols obtained by hydrogenating coconut oil, in the presence of anhydrous zinc chloride.

LAWRENCE H. FLETT.